(12) United States Patent
Mikame

(10) Patent No.: US 7,513,618 B2
(45) Date of Patent: Apr. 7, 2009

(54) NOSE PAD

(75) Inventor: Tetsuo Mikame, Tokyo (JP)

(73) Assignee: Four Nines, Inc., Tokyo (JP)

( * ) Notice: Subject to any disclaimer, the term of this patent is extended or adjusted under 35 U.S.C. 154(b) by 0 days.

(21) Appl. No.: 11/892,346

(22) Filed: Aug. 22, 2007

(65) Prior Publication Data
US 2009/0051867 A1  Feb. 26, 2009

(51) Int. Cl.
  *G02C 5/12*  (2006.01)
(52) U.S. Cl. .................. 351/136; 351/137; 351/138; 351/139
(58) Field of Classification Search .......... 351/136, 351/137, 138, 139
See application file for complete search history.

(56) References Cited

U.S. PATENT DOCUMENTS 2,080,853 A * 5/1937 Nelson .................... 351/90
5,457,506 A * 10/1995 Winkler .................. 351/137
6,598,969 B2 * 7/2003 Asano .................... 351/123

* cited by examiner

Primary Examiner—Hung X Dang
(74) Attorney, Agent, or Firm—Bacon & Thomas, PLLC

(57) ABSTRACT

A nose pad capable of achieving a comfortable wearing sensation, which has no possibility of forming an indentation on side surfaces of a nose resulting in discomfort, is provided. The nose pad is provided with a pad body and a pad core that is integrally provided at a center portion of the pad body. In the pad body, a front surface, a back surface, and a side surface are constructed in combination with one or more curved surfaces. The front surface of the pad body is formed into a curved surface approximately conforming to a nose surface, and therefore a load from eyeglasses can be dispersed over an entire pad body.

2 Claims, 3 Drawing Sheets

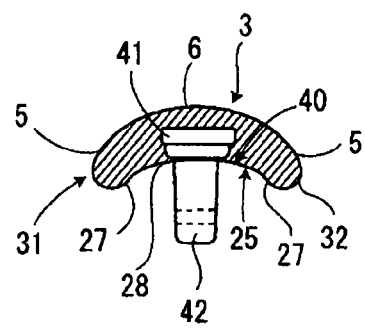
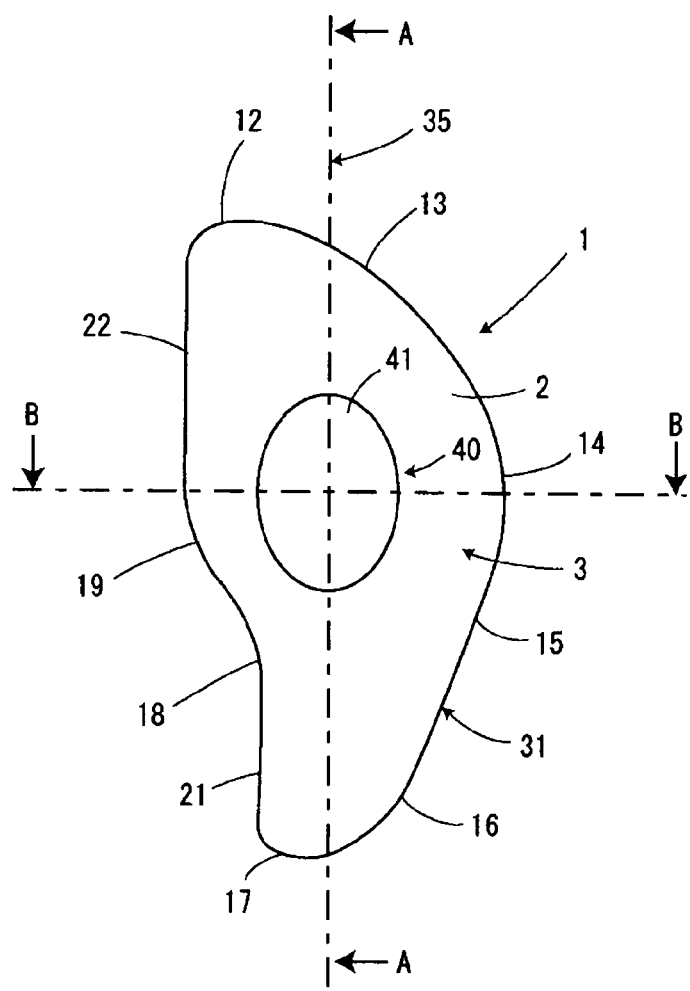

NOSE PAD

BACKGROUND OF THE INVENTION

1. Field of the Invention

The present invention relates to a nose pad and more specifically, to a nose pad having a characteristic of comfortable wearing sensation.

2. Description of the Related Art

As an example of a nose pad, a nose pad provided with a pad body having an elliptic plate shape formed from resin or the like, and a pad core integrally provided with the pad body at a center portion thereof and formed from metal, is known.

In this case, the nose pad's front surface and back surface are each formed to be approximately uniformly flat across the entirety thereof. The nose pad's side surface positioned between the front surface and back surface is formed as a slightly rounded curved surface across the entirety thereof.

Further, eyeglasses are constructed by attaching the pad core of the nose pad with the aforementioned construction to each of a pair of pad legs of a spectacle frame with a screw, and by attaching a lens inside each rim. The eyeglasses can be held at a predetermined position on a face by hooking frame temples on ears while wearing the eyeglasses on the face, and causing the nose pads to be in contact with side surfaces of the nose. Thus, the nose pad function is achieved (Refer to, for example, Terminology Glossary of terms on spectacles of JIS B 7280:1987 glasses framework frames and attached drawings 2 through 6 from the Japanese Industrial Standard.)

Incidentally, in the aforementioned nose pad, when the eyeglasses are worn on the face, although it varies between individuals, the surface of the nose is a gradually curved surface whereas a surface of the pad body is formed into a flat surface. Therefore, the pad body may dig into the nose surface, and an indentation caused by the pad body being pressed against the nose is formed on the nose surface because the load is concentrated to the peripheral edge portion of the pad body. This results in discomfort. Consequently, it becomes difficult to use the nose pad for a long time.

On the other hand, to solve the aforementioned problems, a nose pad in which a pad body is formed from a soft silicone resin or the like, preventing an indentation caused by the pad body from being formed on the surface of the nose by dispersing the load from eyeglasses has been proposed.

However, even in the nose pad that has the construction as described above, an indentation caused by the pad body cannot completely be prevented from being formed on the nose surface and therefore discomfort cannot be fully avoided. Consequently, it becomes difficult to use the nose pad for a long time.

SUMMARY OF THE INVENTION

The present invention has been made to solve the aforementioned problems, and it is an object of the present invention to provide a nose pad having no possibility of causing discomfort due to an indentation forming on the nose surface due to the pad body even when the eyeglasses are used for a long time, which can be sufficiently used for a long time.

According to an aspect of the present invention, a nose pad includes a pad body and a pad core integrally provided in a center portion of the pad body, in which a surface of the pad body is formed as a curved surface having a predetermined curvature.

According to another aspect of the present invention, the surface of the pad body of the nose pad may be formed of one curved surface with a predetermined curvature.

According to still another aspect of the present invention, the surface of the pad body of the nose pad may be formed of a combination of a plurality of curved surfaces with different curvatures.

According to a further aspect of the present invention, the pad body of the nose pad may be formed into a bilaterally-symmetric shape in which shapes of one side and the other side of a center line that passes through the center of the pad core are approximately the same.

In still a further aspect of the present invention, the pad body of the nose pad may be formed into a left-right asymmetric shape in which shapes of one side and the other side of the center line that passes through the center of the pad core are different.

In an advantage of the present invention, since the surface of the pad body is constructed as a combination of one or more curved surfaces, the surface of the pad body can conform to the curvature of a nose surface. Accordingly, when a load from eyeglasses is supported with the nose pad, there is no possibility that the load from the eyeglasses is concentrated to one place on the surface of the pad body, and the load can be dispersed over the entire pad body. Therefore, there is no possibility that an indentation from the pad body is formed on the nose surface, and that discomfort is thereby caused. Accordingly, a comfortable wearing sensation is obtained, and the nose pad can sufficiently be used for a long time.

In another advantage of the present invention, since the pad body is formed into a bilaterally-symmetric shape or a left-right asymmetric shape on the basis of a center line that passes through the center of the pad core, a favorable wearing sensation of the nose pad can be provided for many people with different nose surface shapes by selecting the pad body with a shape best suited to the shape of the nose surface.

BRIEF DESCRIPTION OF THE DRAWINGS

FIG. 3 is a cross-sectional view taken along a line B-B in FIG. 1;

FIG. 4 is a plan view showing a nose pad according to a second embodiment of the present invention;

DESCRIPTION OF THE PREFERRED EMBODIMENTS

Hereinbelow, an embodiment of the present invention is explained with reference to the drawings.

Figure 1:
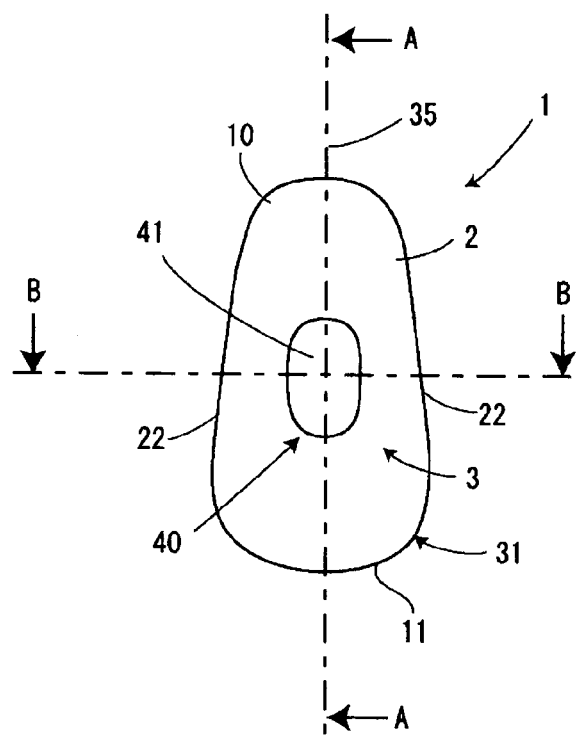
FIG. 1 is a plan view showing a nose pad according to a first embodiment of the present invention.
Figure 2:
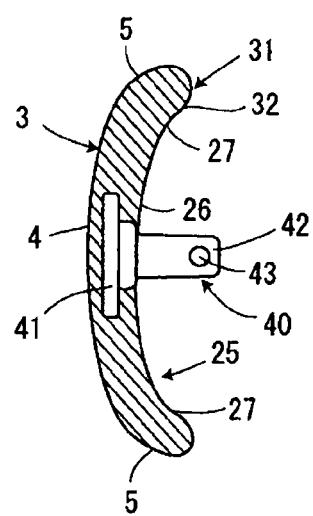
FIG. 2 is a cross-sectional view taken along a line A-A in FIG. 1.

In FIGS. 1 through 3, a nose pad 1 according to a first embodiment of the present invention is shown. The nose pad 1 is provided with a pad body 2 and a pad core 40 that is integrally provided in the pad body 2.

The pad body 2 is formed from any of various kinds of resin material, such as silicone resin or the like, and is formed into a bilaterally-symmetric shape in which shapes on the left and right of a center line 35 as a center that passes through a center of the pad core 40, described later, are approximately the same. In this embodiment, in order to form an outer shape into an approximately elliptical shape with a width gradually narrowing from one end to the other end, a peripheral surface thereof is constructed in combination with two curved surfaces 10 and 11, and two curved surfaces 22 and 22.

The pad body 2 is constructed such that a front surface 3, a back surface 25, and a side surface (peripheral surface) 31 are formed in combination with one or more curved surfaces 4 through 6, 26 through 28, and 32 respectively. The entire shape of the pad body 2 is formed into an arched shape from the front surface 3 side to the back surface 25 side by means of the combination of curved surfaces 4 through 6, 26 through 28, and 32.

That is, the entire shape, with the exception of both of edge portions in a longitudinal direction of the front surface 3 of the pad body 2, is constructed with one curved surface 4 with a predetermined curvature, as shown in FIG. 2. The entire shape, with the exception of both of edge portions in the width direction of the front surface 3 of the pad body 2, is constructed with one curved surface 6 with a predetermined curvature, as shown in FIG. 3. Further, both of the edge portions of the front surface 3 in the longitudinal direction are constructed with curved surfaces 5 and 5 with a curvature smaller than that of the other portion in the longitudinal direction, as shown in FIG. 2, and both of the edge portions of the front surface 3 in the width direction is constructed with curved surfaces 5 and 5 having a curvature smaller than that of the other portion in the width direction, as shown in FIG. 3.

Furthermore, an entire shape, with the exception of both of edge portions in a longitudinal direction of the back surface 25 of the pad body 2, is constructed with one curved surface 26 with a predetermined curvature, as shown in FIG. 2. The entire shape, with the exception of both of edge portions in a width direction of the back surface 25 of the pad body 2, is constructed with one curved surface 28 with a predetermined curvature, as shown in FIG. 3. Moreover, both of the edge portions of the back surface 25 in the longitudinal direction are constructed with curved surfaces 27 and 27 with a curvature smaller than that of the other portion in the longitudinal direction, as shown in FIG. 2. Both of the edge portions of the back surface 25 in the width direction are constructed with curved surfaces 27 and 27 with a curvature smaller than that of the other portion in the width direction, as shown in FIG. 3.

It is preferable that the curvatures of the respective curved surfaces 4 through 6, and 26 through 28 are set such that the front surface 3 and the back surface 25 of the pad body 2 are formed approximately in parallel with each other. In addition, preferably, an entire thickness of the pad body 2 is set such that a thickness of a center portion thereof becomes the largest.

Further, the side surface (peripheral surface) 31 of the pad body 2 is constructed with one curved surface 32 with a predetermined curvature across an entire periphery as shown in FIGS. 2 and 3. The front surface 3 and the back surface 25 of the pad body 2 are smoothly connected by means of the curved surface 32.

Furthermore, the pad body 2 is formed into an arched shape from the side of the front surface 3 to the side of the back surface 25 by constructing the front surface 3, the back surface 25, and the side surface 31 of the pad body 2 by combining the aforementioned curved surfaces 4 through 6, 26 through 28, and 32.

The pad core 40 is composed of an elliptical-plate-shaped head portion 41, and a rectangular rod-shaped leg portion 42 that integrally extends from a center portion of a back surface of the head portion 41. A hole 43 for inserting a screw is provided so that it penetrates the tip end portion of the leg portion 42.

As for the pad core 40, the entire head portion 41 is buried in the center portion of the pad body 2 and the leg portion 42 protrudes outward from the back surface 25 of the pad body 2. In this case, the length of the leg portion 42 is set to be such that the tip end portion of the leg portion 42 slightly protrudes outward in relation to the tip end of the back surface 25 of the pad body 2.

The material of the pad core 40 is not specifically limited, and the pad core 40 can be formed with various kinds of metal, resin, and the like. However, it is required for the pad core 40 to have rigidity not to be distorted by a load of the eyeglasses.

Further, eyeglasses are constructed by attaching the pad core 40 of the nose pad 1 according to this embodiment constructed as described above to, for example, a pad leg of a full-rim type spectacle frame with a screw, and by attaching a lens to the inside portion of a rim of the spectacle frame.

Furthermore, eyesight through lenses is obtained by hooking frame temples on ears, causing the nose pads 1 to be in contact with side surfaces of the nose, and holding the eyeglasses at a predetermined position on the face.

In the nose pad 1 according to this embodiment constructed as described above, the front surface 3 of the pad body 2 is constructed in combination with the curved surfaces 4 through 6, each with a curvature different from the others. Since respective curvatures of the curved surfaces 4 through 6 are set to the curvatures that approximately conform to the surface of a nose, there is no possibility that the load from the eyeglasses is concentrated to the edge portion of the front surface 3 of the pad body 2 when the front surface 3 of the pad body 2 is in contact with the side surface of the nose, and the load can be dispersed to the entire front surface 3 of the pad body 2.

Accordingly, there is no possibility that an indentation with the shape of the pad body 2 is formed on the nose surface, resulting in causing discomfort. Thereby a comfortable wearing sensation is obtained for a long time. Consequently, the nose pad 1 can sufficiently be used for a long time.

Further, since the peripheral edge portion of the front surface 3 side of the pad body 2 is constructed by the curved surfaces 5 and 5 with a curvature smaller than that of the other portion, there is no possibility that the peripheral edge portion of the front surface 3 side of the pad body 2 is caught on the nose surface, and the comfortable wearing sensation is obtained.

Furthermore, since one end portion of the pad body 2 in the longitudinal direction is formed to have a large width in comparison with the other end portion, a comfortable wearing sensation can be provided for many people with different nose shapes. This is achieved by using the nose pad 1 while heading the one end portion with the large width upward or downward corresponding to the shape of the nose surface.

Figure 5:
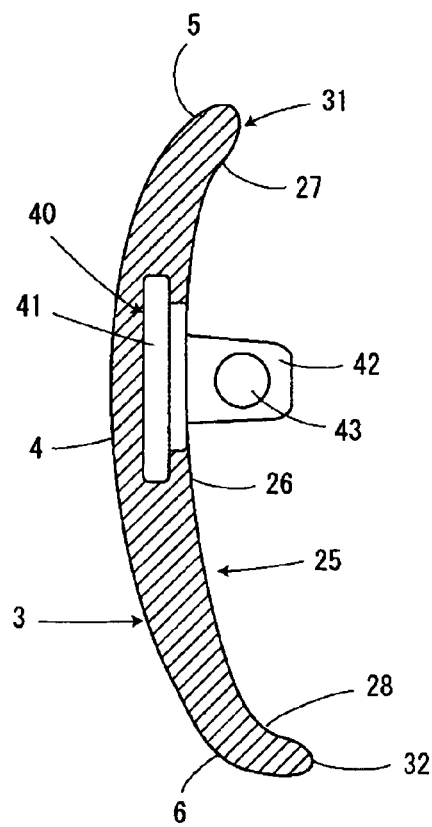
FIG. 5 is a cross-sectional view taken along a line A-A in FIG. 4.
Figure 6:
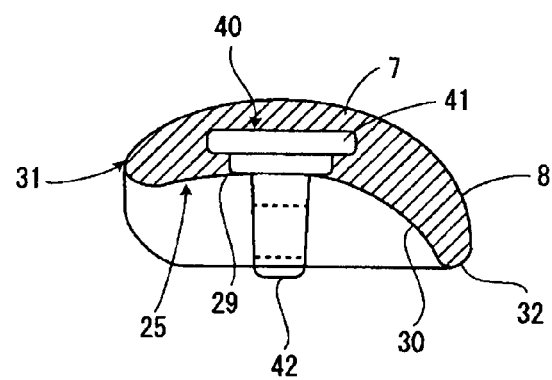
FIG. 6 is a cross-sectional view taken along a line B-B in FIG. 4.

In FIGS. 4 through 6, a second embodiment of a nose pad according to the present invention is shown. The nose pad 1 is constructed such that the front surface 3, the back surface 25, and the side surface (peripheral surface) 31 of the pad body 2 are formed in combination with one or more curved surfaces 4 through 8, 26 through 30, and 32 respectively. In addition, the pad body 2 is formed into, a left-right asymmetric shape in which shapes of one side and the other side of the center line 35 that passes through the center of the pad core 40 are different from each other. The construction other than that described above is identical to that detailed in the aforementioned first embodiment. Incidentally, the nose pad 1 shown in FIGS. 4 through 6 is for use on the right side surface of the nose, and the nose pad 1 for use on the left side surface of the nose is bilaterally-symmetric to that shown in FIGS. 4 through 6, and a detailed explanation thereof is omitted.

That is, the pad body 2 of the nose pad 1 shown in this embodiment is constructed such that a portion on the observer's right of the center line 35 passing through the center of the pad core 40 is formed into an approximate semi-elliptic shape, and the portion on the observer's left of the center line 35 is formed into an approximate rectangular shape. Further, the outer shape of the pad body 2 is constructed in combination with eight large and small curved surfaces 12 through 19, and two flat surfaces 21 and 22. This is so that the center portion width in a longitudinal direction is formed to be largest and the width from the center portion to one end and to the other end in the longitudinal direction is formed to be small.

The entire shape of the front surface 3 of the pad body 2, with the exception of both of edge portions in the longitudinal direction, is constructed from one curved surface 4 with a predetermined curvature, as shown in FIG. 5. The entire shape of the front surface 3, with the exception of the edge portion of one side in the width direction, is constructed from one curved surface 7 with a predetermined curvature, as shown in FIG. 6. In addition, as shown in FIG. 5, the edge portion of one side in the longitudinal direction is constructed from a curved surface 5 having a curvature smaller than that of the other portion, and an edge portion of the other side in the longitudinal direction is constructed from a curved surface 6 with a curvature smaller than that of the edge portion of one side. As shown in FIG. 6, the edge portion of one side in the width direction is constructed from a curved surface 8 having a curvature smaller than that of the other portion.

The entire shape of the back surface 25 of the pad body 2, with the exception of both of edge portions in the longitudinal direction, is constructed from one curved surface 26 with a predetermined curvature, as shown in FIG. 5. The entire shape of the back surface 25, with the exception of an edge portion of one side in the width direction, is constructed from one curved surface 29 with a predetermined curvature, as shown in FIG. 6. In addition, as shown in FIG. 5, the edge portion of one side in the longitudinal direction is constructed from a curved surface 27 with a curvature smaller than that of the other portion. The edge portion of the other side in the longitudinal direction is constructed from a curved surface 28 with a curvature smaller than that of the edge portion of one side. As shown in FIG. 6, an edge portion of one side in the width direction is constructed from a curved surface 30 with a curvature smaller than that of the other portion.

It is preferable that the curvatures of the respective curved surfaces 4 through 8, and 26 through 30 are set such that the front surface 3 and the back surface 25 of the pad body 2 are formed approximately in parallel with each other. In addition, preferably, the entire thickness of the pad body 2 is set such that a thickness of the center portion thereof becomes to be largest.

Further, the side surface (peripheral surface) 31 of the pad body 2 is constructed with one curved surface 32 with a predetermined curvature across an entire periphery as shown in FIGS. 5 and 6, and the front surface 3 and the back surface 25 of the pad body 2 are smoothly connected by means of the curved surface 32.

The pad core 40 has a construction similar to that detailed in the aforementioned first embodiment, and as shown in FIGS. 5 and 6, the head portion 41 is buried in the center portion of the pad body 2, and the leg portion 42 protrudes outward from the back surface 25 of the pad body 2. In this case, as for the pad core 40, the length of the leg portion 42 is set to be such that the tip end portion of the leg portion 42 slightly protrudes outward in relation to the tip end of the back surface 25 of the pad body 2.

Furthermore, eyeglasses are constructed by attaching the pad core 40 of the nose pad 1 according to this embodiment constructed as described above to, for example, the pad leg of the full-rim type spectacle frame with the screw, and by attaching the lens to the inside portion of the rim of the spectacle frame.

Moreover, eyesight through lenses is obtained by hooking frame temples on ears, causing the nose pads 1 to be in contact with side surfaces of the nose, and holding the eyeglasses at the predetermined position of the face.

In the nose pad 1, according to this embodiment constructed as described above, the front surface 3 of the pad body 2 is constructed in combination with a plurality of curved surfaces 4 through 8, each with a curvature different from the others. The curvatures of the curved surfaces 4 through 8 are set to values that approximately conform to the nose surface. Consequently, there is no possibility that the load from the eyeglasses is concentrated to a portion of the front surface 3 of the pad body 2 when the front surface 3 of the pad body 2 is in contact with the side surface of the nose, and the load can be dispersed to the entire front surface 3 of the pad body 2.

Accordingly, there is no possibility that an indentation with the shape of the pad body 2 is formed on the nose surface resulting in discomfort, and thereby the comfortable wearing sensation is obtained for a long time. Consequently, the nose pad 1 can sufficiently be used for a long time.

Further, since the peripheral edge portion of the pad body 2 is constructed with the curved surfaces 5, 6, and 8 with curvatures smaller than that of the other portion, the peripheral edge portion of the pad body 2 can be prevented from being caught on the nose surface, and a comfortable wearing sensation is obtained.

Furthermore, since the outer shape of the pad body 2 is formed into a left-right asymmetric shape around the center line 35 as a center that passes through the pad core 40, there is no possibility that the front surface 3 of the pad body 2 needlessly comes to contact with the nose surface and therefore a comfortable wearing sensation is obtained. Moreover, the pad body 2 can also be visually pleasing.

What is claimed is:

1. A nose pad comprising:
   a pad body; and
   a pad core integrally provided in a center portion of the pad body,
   wherein a surface of the pad body is formed as a curved surface having a predetermined curvature,
   wherein the surface of the pad body is formed in combination with a plurality of curved surfaces with different curvatures,
   wherein the pad body is formed with a left-right asymmetric shape wherein shapes on a first side and a second side of a longitudinal center line passing through the center of the pad core are different, and
   wherein a cross-section of the pad body taken along a line perpendicular to said center line has a left-right asymmetry about said center line such that a back surface of the pad body has a curvature on a first side of the center line that is greater than a curvature on a second side of the center line.

2. The nose pad of claim 1, wherein a cross-section of the pad body taken along the center line has an asymmetry such that a first portion of the back surface below the pad core has a different curvature than a second portion of the back surface above the pad core.

* * * * *